(12) United States Patent
Ebel

(10) Patent No.: US 11,727,002 B2
(45) Date of Patent: Aug. 15, 2023

(54) SEGMENT TREND ANALYTICS QUERY PROCESSING USING EVENT DATA

(71) Applicant: Datorama Technologies Ltd., Tel-Aviv (IL)

(72) Inventor: Lior Ebel, San Francisco, CA (US)

(73) Assignee: Datorama Technologies Ltd., Tel-Aviv (IL)

( * ) Notice: Subject to any disclaimer, the term of this patent is extended or adjusted under 35 U.S.C. 154(b) by 0 days.

(21) Appl. No.: 17/372,460

(22) Filed: Jul. 11, 2021

(65) Prior Publication Data

US 2023/0010139 A1 Jan. 12, 2023

(51) Int. Cl.
*G06F 16/2453* (2019.01)
*G06F 16/2458* (2019.01)

(52) U.S. Cl.
CPC .... *G06F 16/24545* (2019.01); *G06F 16/2471* (2019.01); *G06F 16/24532* (2019.01)

(58) Field of Classification Search
CPC .......... G06F 16/24545; G06F 16/2471; G06F 16/24532
USPC ........................................................ 707/720
See application file for complete search history.

(56) References Cited

U.S. PATENT DOCUMENTS

| | | | |
|---|---|---|---|
| 8,510,807 B1 * | 8/2013 | Elazary | G06F 16/256 709/224 |
| 11,061,910 B1 * | 7/2021 | Kondiles | G06F 16/24568 |
| 2020/0167355 A1 * | 5/2020 | Rath | G06F 16/2433 |
| 2021/0382920 A1 * | 12/2021 | Eltabakh | G06F 16/24545 |

* cited by examiner

*Primary Examiner* — Robert W Beausoliel, Jr.
*Assistant Examiner* — Arthur Ganger

(57) ABSTRACT

A method, system, and computer program product for conserving resources in segment trend analytics query processing using event data. A set of events of an entity is aggregated and sorted from earliest to last, and sequentially processed to incrementally set a subset therefrom. A predicate function for determining segment membership is applied respective of a linear timeline of events of the subset represented by a time of an event processed. A data record comprising identification of the entity, time, and respective segment is generated and stored. Data records are aggregated by respective identification of a segment and a time comprised therein, and at least one analytic measure respective of entities which identification thereof is comprised therein, is calculated and stored. An indication of the at least one analytic measure calculated respective of a segment and a time queried is returned, whereby determination of a trend of the segment is enabled.

18 Claims, 7 Drawing Sheets

```
CREATE TABLE "customer_updates"("cust_id" VARCHAR,
"cust_name" VARCHAR, "cust_country" VARCHAR,
"cust_birthday" DATE, "update_date" DATE);

insert into "customer_updates"("cust_id", "cust_name",
"cust_country", "cust_birthday", "update_date")
values ('1', 'Joe A.', 'US', date '1970-02-02', date '2021-02-02'),
       ('2', 'Joe B.', 'US', date '1970-02-03', date '2021-02-02');

CREATE TABLE "customer_purchases"("cust_id" VARCHAR,
"purchase_date" DATE, "purchase_price" INT, "product_id"
VARCHAR, "product_category" VARCHAR);

insert into "customer_purchases"("cust_id", "purchase_date",
"purchase_price", "product_id", "product_category")
values ('1', date '2020-12-12', 270, 'CX20', 'electronics'),
       ('2', date '2019-12-12', 220, 'CY20', 'clothing');
```

FIG. 1

```
select "customer_updates"."cust_id" from "customer_updates"
join "customer_purchases" on "customer_purchases"."cust_id"
= "customer_updates"."cust_id"
where "purchase_price" > 200 and
"customer_purchases"."purchase_date" < '2020-01-01' ;

select "customer_updates"."cust_id" from "customer_updates"
join "customer_purchases" on "customer_purchases"."cust_id"
= "customer_updates"."cust_id"
where "purchase_price" > 200 and
"customer_purchases"."purchase_date" < '2021-01-01' ;
```

FIG. 2

| Segment name | Date | Segment Size | | | |
|---|---|---|---|---|---|
| seg1 | 12/31/2019 | 1 | | | |
| seg1 | 12/31/2020 | 2 | | | |

FIG. 3

```
public class Purchase_event {
    public int account_id;
    public double price;
} public static boolean check_segment_membership(int account_id,
List<Purchase_event> events)    {
    for (Purchase_event e:events)    {
        if (e.price >100) return true;
    }
    return false;
}
```

FIG. 4

```
select segment_name, day, count(distinct entity_id)
from segment_membership
group by segment_name, day;
```

FIG. 5

SEGMENT TREND ANALYTICS QUERY PROCESSING USING EVENT DATA

BACKGROUND

Some embodiments relate to data analysis and, more specifically, but not exclusively, to segment trend analytics query processing using event data.

In various prevalent contexts, a dataset typically comprises some form of a description and/or documentation of a set of entities and, optionally, of various aspects pertaining them. In some data settings, a segment is a subset of entities defined by some criteria. Similarly, a segment query is defined as a query which identifies such subset in accordance with such predetermined criteria specified.

In some practical applications and real-life scenarios, the criteria may relate to a set of conditions over historical events data for the entities in question. Historical trends analytics of queried segmentations are aggregates to be calculated over all the segments of interest and for all time points in the past. The aggregated values can be further analyzed and/or viewed by users and/or processed by automated services, such as for example, allowing for users to explore segment daily size trend through the last two years, and/or any likewise segment historical trend analysis.

In a setting where there are billions of data points and many thousands of segments, the goal and task of calculating aggregates over all—or even some—of the segments of interest and historical points in time, may become intractable and prohibitively resource consuming in terms of time and/or energy. For example, under a naïve or brute force approach, independently and obliviously calculating different historical snapshots of each segment for each point in time in the past, requires considerable amount of time and computing cycles, since the data is repeatedly scanned throughout for matches with the defined criteria as many times as the number of segment queries at hand, where each segment query pertains a distinct segment and time point pair.

While pre-existing approaches allow users to define segments of interest and start tracking trend analytics thereof in a prospective manner from that point in time and onwards, no computationally feasible course of action is known for handling segment trend analytics queries relating to historical events data.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIG. 1 is an exemplary code excerpt of data tables and contents relating to entities and events thereof;

FIG. 2 is an exemplary code excerpt of segment queries of different portions of historical data over time;

FIG. 3 is an exemplary output table of aggregated values for all combinations of segments and time points;

FIG. 4 is an exemplary code excerpt of filtering events by defined criteria;

FIG. 5 is an exemplary code excerpt of a search query grouping and calculating aggregates of all records of a same pair of segment and timepoint;

DETAILED DESCRIPTION

Figure 6:
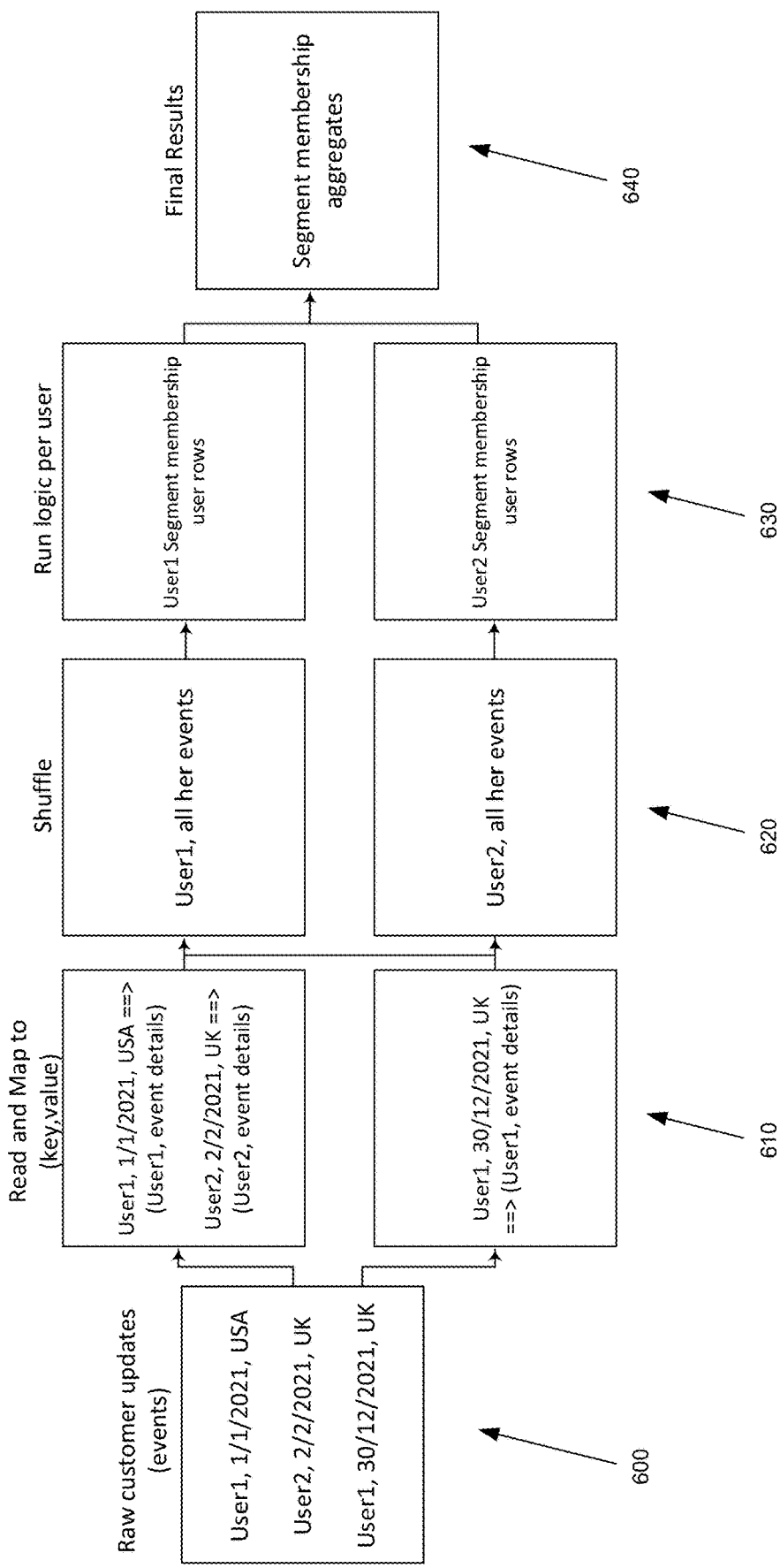
FIG. 6 is a block diagram depiction of exemplary distributed calculations of segmentation historical trends.

According to one aspect of the disclosed subject matter there is provided a method for conservation of computational resources of a database system, comprising: receiving, at the database system, comprising a computer including a processor coupled to a storage device comprising a data store, a database query comprising an identification of at least one segment of interest defined by a set of criteria to be satisfied by respective member entities thereof; for an entity of a plurality of entities, performing, by the processor at the database system: aggregating a set of events of the respective entity sorted in an ascending order from earliest to latest; sequentially processing the set of events to incrementally setting a subset of events therefrom; applying a predicate function for determining segment membership respective of a linear timeline of events of the subset represented by a time of an event processed; and, in response to the predicate function returning a segment membership indication, generating and storing at the data store a data record comprising an identification of the entity, the time, and the respective segment; calculating and storing, for a plurality of data records of the data store aggregated by a respective identification of a segment and a time comprised therein, at least one analytic measure respective of a set of entities which identification thereof is comprised in the plurality of data records; and, returning an indication of the at least one analytic measure calculated respective of a segment and a time queried, whereby determination of a trend of the segment is enabled.

According to another aspect of the disclosed subject matter there is provided a computer program product comprising: a non-transitory computer readable storage medium; program instructions for executing, by a processor coupled to a storage device comprising a data store, a method for conservation of computational resources of a database system, the method comprising: receiving, at the database system, comprising a computer including the processor, a database query comprising an identification of at least one segment of interest defined by a set of criteria to be satisfied by respective member entities thereof; for an entity of a plurality of entities, performing, by the processor at the database system: aggregating a set of events of the respective entity sorted in an ascending order from earliest to latest; sequentially processing the set of events to incrementally setting a subset of events therefrom; applying a predicate function for determining segment membership respective of a linear timeline of events of the subset represented by a time of an event processed; and, in response to the predicate function returning a segment membership indication, generating and storing at the data store a data record comprising an identification of the entity, the time, and the respective segment; calculating and storing, for a plurality of data records of the data store aggregated by a respective identification of a segment and a time comprised therein, at least one analytic measure respective of a set of entities which identification thereof is comprised in the plurality of data records; and, returning an indication of the at least one analytic measure calculated respective of a segment and a time queried, whereby determination of a trend of the segment is enabled.

According to yet another aspect of the disclosed subject matter there is provided a system for conservation of computational resources of a database system, comprising: a processing circuitry coupled to a storage device comprising a data store and adapted to execute a code for: receiving, at the database system, comprising a computer including the processing circuitry, a database query comprising an identification of at least one segment of interest defined by a set of criteria to be satisfied by respective member entities thereof; for an entity of a plurality of entities, performing, by the processing circuitry at the database system: aggregating a set of events of the respective entity sorted in an ascending order from earliest to latest; sequentially processing the set of events to incrementally setting a subset of events therefrom; applying a predicate function for determining segment membership respective of a linear timeline of events of the subset represented by a time of an event processed; and, in response to the predicate function returning a segment membership indication, generating and storing at the data store a data record comprising an identification of the entity, the time, and the respective segment; calculating and storing, for a plurality of data records of the data store aggregated by a respective identification of a segment and a time comprised therein, at least one analytic measure respective of a set of entities which identification thereof is comprised in the plurality of data records; and, returning an indication of the at least one analytic measure calculated respective of a segment and a time queried, whereby determination of a trend of the segment is enabled.

Optionally the subset is a prefix subset comprising successive events of the set starting at an earliest event thereof and grown per iteration by a respective event for which a time thereof is immediately succeeding a time of a last event processed in preceding iteration, whereby avoiding processing of events with times later than the time of the respective event.

Optionally the at least one analytic measure is a quantity of a segment-related value selected from the group: a count; an average; a sum; a minimum; and a maximum.

Optionally a plurality of machines for performing parallel processing are employed, wherein one of the plurality of machines is assigned with one entity of the plurality of entities and respective set of events thereof, and another of the plurality of machines is assigned with a different entity of the plurality of entities and respective set of events thereof.

Optionally the plurality of data records is retrieved from the data store using a distributed search query engine.

Optionally the method further comprising outputting to a user an indication of the trend determined.

Optionally the computer program product further comprising program instruction to cause the processor to perform: outputting to a user an indication of the trend determined.

Optionally the processing circuitry is further adapted to execute code for: outputting to a user an indication of the trend determined.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to data analysis and, more specifically, but not exclusively, to segment trend analytics query processing using event data.

The disclosed subject matter is aimed at providing a method and system for calculating aggregated segment queries data trends in a scalable and cost-effective way. The aggregated values may be computed for a plurality of segments of interest and/or over multiple points of time, including ones that are in the past. In the context of the present disclosure, a segment is a subset of entities within a dataset defined by some criteria and a segment query is a query which identifies such subset as defined by such criteria. In some exemplary embodiments, the criteria may relate to a set of conditions over historical events data for entities of the dataset.

Calculating aggregates of data for all combinations of segments and time points may be challenging computation-wise. One common and straightforward approach is to generate a query for each time point and each segment, execute each of the queries generated and save the results. For M queries and S segments, there would be thus required M*S query executions. For all types of databases, executing a query may involve reading one or more tables of data, which may be large. Doing so M*S times may take several days or even longer for a database comprising a few billion records, depending on the overall number of queries M and segments S. For practical reasons, the number of queries M can be about a year (365 days) and the number of segments S can be in the thousands. This would mean that the common implementation may read the data table(s) at least 365,000 times!

In some embodiments of the disclosed subject matter, during a first processing stage, all events pertaining to a same entity are sorted by time from earliest to last, and segment membership is tested for a subset thereof which is incrementally grown by one event at a time in an ascending order, i.e. in each iteration the subset of events is incremented by addition thereto of the earliest event not yet added to the subset in any preceding iterations. In case that the criteria identifying a respective segment of interest are found to be satisfied by the subset of events at a current iteration, then a respective record identifying the entity, the time of the event processed in the current iteration (i.e. latest in time respective of all events in the subset), and the segment to which the entity is thus found to belong at that particular time point, is generated and saved in a data store. Then, during a second processing stage, for all segments and for all respective time points as recorded in the store during the first stage, a requested aggregate and/or analytical measure (such as, for example, count, sum, average, max, min, and/or the like) is calculated respective of all entities recorded in the data store as belonging to the respective segment at the respective time point. The calculation result may be similarly saved in a data record storing the aggregated value along with an identification of the respective segment and time point. Trends over the respective points in time of the calculated aggregates and/or analytics of segments of interest can then be viewed and/or explored by users, and/or be further analyzed and/or processed by advanced data analysis procedures and/or tools.

One technical and advantageous effect of the disclosed subject matter is that data stored in the database that is being queried for segmentations and analytics trends thereof, is thus scanned only once throughout the procedure, as opposed to a naïve approach which requires running multiple queries sequentially and/or in parallel, thus scanning the data as multiple times as the number of segment queries and historical time points researched.

In some exemplary embodiments, further improvement in efficiency by parallel processing, such as implemented using a distributed system of a plurality of machines remotely interconnected to one another and/or to one or more centralized master machines, can be achieved by allocating different machines to different entities and respective event data thereof to be processed by each. In some further exemplary embodiments, the data store recording intermediate and/or final computation results can optionally be a decentralized one, with a distributed search engine running over it (for calculating the analytics from the recorded entity-time-segment tuples).

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For purpose of illustrating how the disclosed subject matter may be carried out and utilized, exemplary use cases and scenarios are described herein in further detail.

In one exemplary setting, an entity is a customer, in a context of an e-commerce or marketing system. Alternatively, as another exemplary setting, the entity and data types relating thereto may be patients in a health data system, such as a COVID-19 data system for tracking and monitoring personal contacts and outbreaks, or, in yet another exemplary setting, the entities and their pertaining data as collected by a respective information gathering and recordation tool may be drivers and spatial motion data in a navigation application program being in use thereby, and/or any likewise settings.

As a walkthrough example for illustration purposes, such an exemplary scenario of customers in a sales and marketing system, is further elaborated herein. In this walkthrough example illustrated herein, it is assumed that the data types of interest consist of the following two exemplary tables: one for retaining customer details, and another one for retaining purchase details.

The first table which is referred to herein as "customer_updates" is purported to capture update events that occurred throughout history regarding one or more personal details of customers, such as for example names and/or addresses of customers, and/or any likewise information that is potentially mutable over time. For example, the first table optionally contains as main columns thereof one or more of the following field types: (1) cust_id—an identifier of a customer; (2) cust_name—a name of a customer; (3) cust_country—a country of a customer; (4) cust_birthday—birthday date of a customer; (5) update_date—a date at which any one of these values were updated.

The second table which is referred to herein as "customer_purchases" is purported to describe historical purchase events for customers. For example, the second table optionally contains one or more columns such as the following: (1) cust_id—an identifier of a respective customer; (2) purchase_date—a date of a respective purchase; (3) purchase_price—a monetary value of a respective purchase price, e.g., a sum paid in a predetermined currency, such as US$ or the like. (4) product_id—an identifier of a respective purchased product; (5) product_category—a category of a respective purchased product (such as, for example, "electronics", "fashion", and/or the like).

Reference is now made to FIG. 1 which is an exemplary code excerpt of data tables and contents relating to entities and events thereof.

As shown in FIG. 1, a first table called "customer_updates" having columns labeled "cust_id", "cust_name", "cust_country", "cust_birthday" and "update_date" is defined and populated with values relating to two customers named 'Joe A.' and 'Joe B.' located in the US and born on the $2^{nd}$ and $3^{rd}$ day of February 1970, respectively. Similarly, as further shown in FIG. 1, a second table called "customer_purchases" having columns labeled "cust_id", "purchase_date", "purchase_price", "product_id" and "product_category" is defined and populated with values relating to two purchase events, one by each of the customers identified in the first table.

As defined herein, a segment query is a set of one or more criteria which filters some subset of the entities, by applying conditions on their historical events data. As an illustrative example, one exemplary segment that may be considered of interest in a context of a marketing system recording customers and purchase events thereof, as in the walkthrough exemplary setting discussed herein, is as the following: all customers who purchased some product which costs more than 200$.

Reference is now made to FIG. 2 which is an exemplary code excerpt of segment queries of different portions of historical data over time.

As shown in FIG. 2, segment queries may be employed to calculate segments of interest at different points in time, using data up to each of the respective terminating cutoffs specified. The segment queries may be implemented in Standard Query Language (SQL), such as the two SQL expressions illustrated in FIG. 2, or in any likewise database querying format. For illustration purposes and ease of understanding, the exemplary SQL expressions shown in FIG. 2 are referring to same exemplary data tables such as defined and depicted in FIG. 1 and accompanying text thereof. In the exemplary segment queries as illustrated in FIG. 2, both SQL expressions are aimed at calculating the exemplary segment discussed herein, which consists of distinct customers with purchase price of over 200. However, the first of which is aimed at calculating the segment for data respective of 2019 and up thereto inclusive, whereas the second is aimed at calculating the segment for all data up to 2020 inclusive.

As defined herein, a segment query aggregate value can be, for example, one of the following: (1) a total count of entities belonging to a segment in a certain point in time (a "size" of the segment query result); (2) a sum, average, maximum, minimum and/or a likewise value of some field value of entities belonging to the segment (e.g., in the running example used herein for illustration purposes, an average age of customers in a segment, and/or the like).

For illustration purposes, in the running example herein, one may be interested, for example, in calculating the trend in sizes of the segments in past years, in order to see if they are growing segments or not. This analytic data can be used for informing and improving decision making processes, for example, in the context of sales such as in the running example herein, the data may be used for marketing optimizations, as well as for product roadmap planning (i.e., where a seller may choose to invest in a product relevant for certain segments), and/or the like.

Reference is now made to FIG. 3 which is an exemplary output table of aggregated values for all combinations of segments and time points.

As shown in FIG. 3, the exemplary output table comprises 3 columns, one of which identifies each segment of interest to which the aggregate data pertains (referred to in FIG. 3 as "Segment name"), another one specifies a respective time point which up thereto that aggregate data is calculated (entitled "Date" in FIG. 3), and yet another one contains the calculated aggregate value, such as, for example, a size of the segment in question (i.e. "Segment size" column, as illustrated in FIG. 3), and/or any likewise segment query data aggregates.

For illustration purposes and ease of understanding, the exemplary output table and contents thereof as shown in FIG. 3 are referring to the exemplary data tables and segment queries depicted in FIGS. 1 to 2 and accompanying text thereof. According to the exemplary data as shown in FIG. 1, and the exemplary segment queries as shown in FIG. 2, the respective segment of the walkthrough example herein, when calculated in the year 2019 (with data up thereto inclusive), includes only one customer (which is identified as '2' in the customer table as shown in FIG. 1), whereas when calculated in the year 2020 with all data up thereto inclusive, the segment includes both customers. As shown in FIG. 3 in the exemplary output table, the resulting aggregate values of the segment's size for each of the time points up to which the data or respective portions thereof are being looked at, may be stored and/or presented for review on demand.

For the sake of ease and convenience in describing the disclosed subject matter, it is assumed hereinafter that event data of entities in the database are logged in daily, such that the most basic time units dealt with herein are calendar dates. However, as can be readily understood by a person skilled in the art, the disclosed subject matter is not limited in such manner and time units of any sort and/or magnitude, either smaller and/or larger, regularly and/or non-regularly spaced apart, and/or the like, may be employed as well without departing scope of the disclosed subject matter.

Formally, the task at hand to which the disclosed subject matter pertains, is defined as follows: for each segment S and each date value D in the event data, calculate predefined aggregate values for the segment S in date D. Optionally the aggregate values are stored in a table, which contains three columns as follows: (1) segment_id; (2) date; and (3) value.

In some embodiments, the aggregate values calculation may be performed using an algorithm such as described herein. For ease and convenience of illustration, in the algorithm description herein the calculation is aimed at a count aggregation (i.e. a number of distinct entities in a segment of interest), however the disclosed subject matter is not limited in such manner, and, as would be readily apparent to a person skilled in the art, the algorithm described herein can be trivially adapted to calculate by similar manner and principles any other aggregation as well such as, for example, average, minimum, maximum, sum, and/or the like.

The algorithm may comprise the following steps:
1. Group the events by entity identification, and send each group of events (i.e. of a same entity identifier) to processing in an independent manner (e.g. to one of multiple machines and/or nodes in a cluster).
2. In each machine and for each group of events of the same entity identifier E, do the following for each date value D:
   a. Filter the group of events to obtain a sub-group containing only the events which have a date value that is not later than D.
   b. For the sub-group of events after filtering in sub-step a., and for each segment S, check if the entity matches the criteria of S.
   c. If the entity matches the criteria of the segment, write a row containing <S,E,D> to a data store. This row represents the fact that in the date D, entity E belonged to segment S.
3. Run a search query which retrieves and groups all rows of the format <S,E,D> by the pairs <S,D>, and counts the number of entities E for the pair <S,D>. The results are stored in the data store as rows in the format <S,D,Count>, where each of the rows represents the fact that the total number of entities in segment S on date D equals to "Count".

It will be appreciated by a person skilled in the art that the check for segment membership required in sub-step b. may be done using standard code, such as Java or Java-like, which has a method or function that takes a list of events as a parameter or argument, and applies a set of conditions or predicate on each.

Optionally the data store used in sub-step c. may be a distributed file system.

Optionally the search query in step 3 may be an SQL query over a distributed SQL engine (over the cluster).

Reference is now made to FIG. 4 which is an exemplary code excerpt of filtering events by defined criteria.

As shown in FIG. 4, a predicate function for checking segment membership of an entity according to events related thereto that meet specified conditions, may be implemented for example in Java or the like. In the exemplary code shown in FIG. 4 the predicate function filters only accounts (i.e. unique customer identifiers) which have purchased any product with a price of more than 100. To vit, the function returns true if an event is found for which the purchase price is over 100 and otherwise it returns false.

Reference is now made to FIG. 5 which is an exemplary code excerpt of a search query grouping and calculating aggregates of all records of a same pair of segment and timepoint.

As shown in FIG. 5, following processing of all events of each of a plurality of entities as recorded in a respective database being queried, whereby obtaining a data store of segment membership over time containing a plurality of records in a format of <segment_id, entity_id, date>, then each 3-tuple record conforming to an identification <segment_name, day> of specific segment and timepoint pair is retrieved from the data store (referred to in FIG. 5 as "segment_membership"), and an aggregate value of the respective segment at the respective timepoint, such as a count of distinct entities belonging to that segment in that timepoint as illustrated in FIG. 5, is calculated accordingly and the resulting aggregates are grouped as records containing the 3-tuples of the values <segment_name, day, count>.

Reference is now made to FIG. 6 which is a block diagram depiction of exemplary distributed calculations of segmentation historical trends.

As shown in FIG. 6, a task of calculating aggregates of segment queries at historical timepoints may be directed to a plurality of nodes in a cluster. For convenience and ease of depiction, an exemplary usage of two nodes in calculation of segmentation historical trends is illustrated in FIG. 6, however the disclosed subject matter is not limited in such manner and a cluster of any arbitrary size and/or any number of nodes therein may be utilized as well.

At 600, a database may be populated with raw data of entities and/or events relating thereto, e.g. customer updates in a marketing system, such as in the exemplary setting of the walkthrough example discussed herein.

At 610, the raw events data recorded in the database at 600 may be read and mapped into (key, value) pairs, where an entity's identifier serves as key and respective event details are the mapped value. Optionally the reading and mapping may be allocated to multiple nodes, for example by dividing the database records into disjoint subsets each of which assigned to a different machine, and/or the like.

At 620, the data mapped into pairs of entity identification and event details respectively at 610 may be shuffled and/or reduced by key, such that all events of a same entity are grouped together and coupled to a respective identifier thereof. Optionally the shuffling and/or reduction may be similarly performed in parallel by a multiplicity of cluster nodes, for example, a same machine assigned with mapping may proceed and perform the reduction too.

It will be appreciated by a person skilled in the art that, while in FIG. 6 the mapping and the reduction are illustrated as separate operations, a merging thereof into a single step of map and reduce may similarly be employed.

At 630, logic may be run per each entity (i.e. customer user) on the respective set of events thereof for checking segment membership at each historical timepoint.

At 640, final results of segment membership aggregates may be calculated for each segment and historical timepoint pair as described herein.

Figure 7:
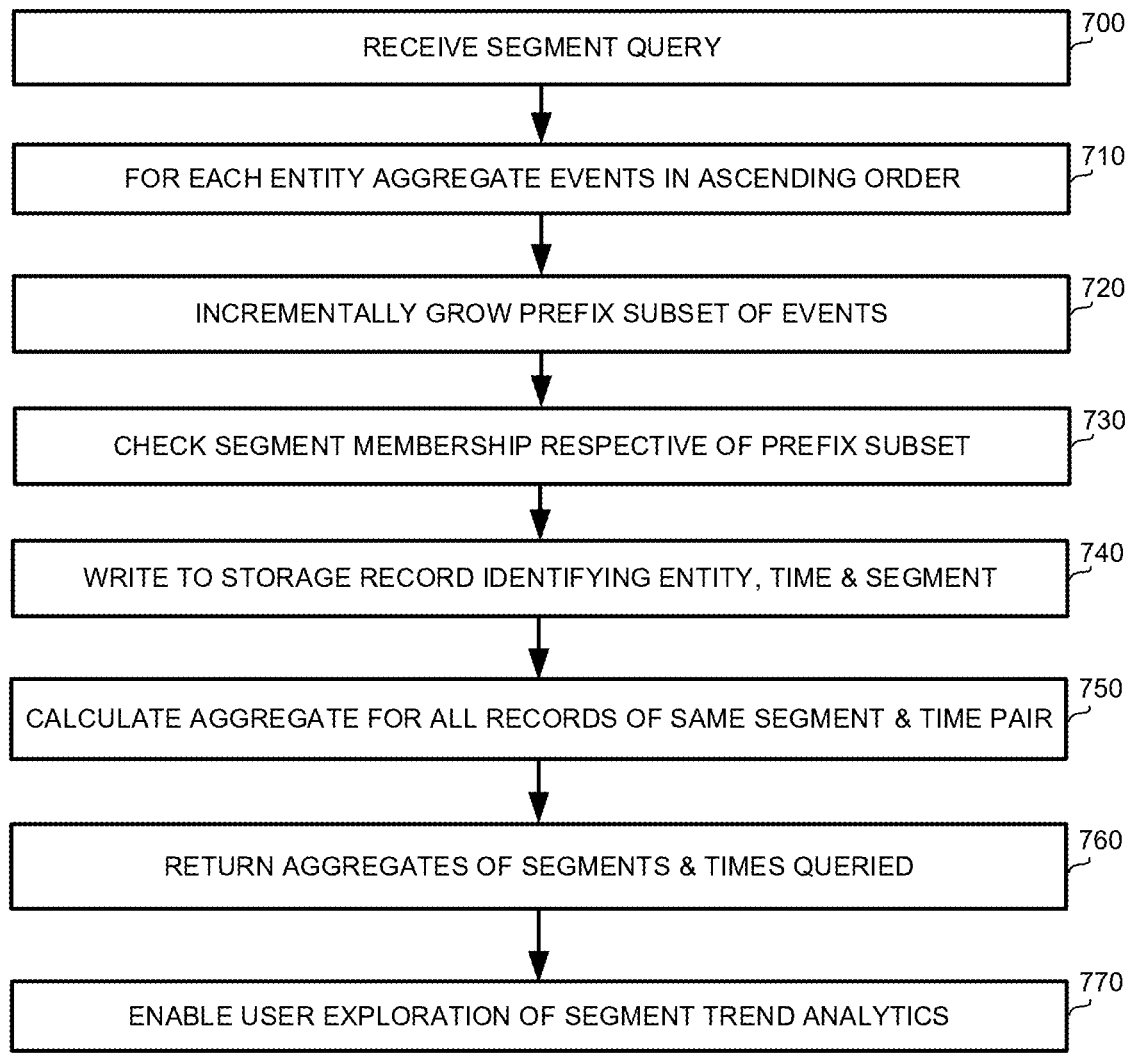
FIG. 7 is a flowchart of a method for segmentation analytics trend calculation.

Reference is now made to FIG. 7 which is a flowchart of a method for segmentation analytics trend calculation.

At 700, a segment query identifying at least one segment of interest may be received. The at least one segment may be defined by a set of criteria to be satisfied by respective member entities thereof. For example, in the exemplary setting herein of customers in a marketing system, a segment of interest may be, e.g., all customers based in Florida who have kids and shopped online at least once within a one-month period.

At 710, for each of a plurality of entities recorded in a database queried by the segment query received at 700, a set of events of the respective entity, as recorded in the database, may be aggregated together and sorted in an ascending order from earliest to latest.

At 720, the set of events aggregated and sorted at 710 may be sequentially processed in order of thereby incrementally growing and setting a prefix subset of events, which may be obtained by filtering the set of events to exclude therefrom all events of a later time than of a timepoint being queried, such as for example, a particular date of interest and/or the like. Additionally or alternatively, the cutoff timepoint for filtering the prefix subset from the sorted set of events may be determined as a respective time of an event being a last one to be joined into the subset, i.e. an event immediately succeeding another event processed in last preceding iteration.

At 730, segment membership of a respective entity for which the set of events are processed to obtain the prefix subset at 720, may be checked, for example, by applying a predicate function configured for determining segment membership respective of a linear timeline of events of the subset represented by a time of an event processed.

At 740, responsive to the predicate function returning a segment membership indication, a data record comprising an identification of the entity, the time, and the respective segment may be generated and stored at a data store.

At 750, a respective aggregate value and/or any likewise analytical measure may be calculated and stored for each pair of segment and timepoint queried by the segment query received at 700, for example, by retrieving and aggregating together by a respective identification of the segment and timepoint of the respective pair a plurality of data records of the data store populated through iterative executions of 710, 720 and 730.

At 760, aggregates for the segment and timepoint pairs calculated at 750 may be returned in an output, for example, in a form of a table such as the output table shown in FIG. 3 herein.

At 770, user exploration of segment trend analytics may be enabled, for example, by presentation of the output returned at 760, and/or by providing thereof to user analysis and/or visualization tools for further processing and communication via a suitable interface.

It will be appreciated that the disclosed subject matter provides advantages and benefits and improves upon standard and pre-existing approaches for segments calculations, to run a distributed query or data pipeline over a cluster of machines, and store the results in a distributed data store. Such approach requires to load the events data per segment and per date. In contrast, when utilizing the disclosed subject matter, loading of the events data of each entity is performed exactly once (without any dependency in the number of segments or dates in the data), and all the calculations per segment and date are done in memory after loading the data. This minimizes the number of data loads and shuffles in the cluster, while taking advantage of the assumption that the data is events based, and each update to the data is represented as an event (and thus overrides an entire row—meaning that one can have several events per entity and can simulate the entity in a certain point in time according to this).

It will further be appreciated by a person skilled in the art that the disclosed subject matter entails several non-trivial steps: 1) assumption of the data to be events based; 2) aiming to optimize data reads and shuffles while calculating all segments and date ranges, in a holistic view; 3) splitting the process into two parts: calculating segment membership, and then aggregating over the results of the previous step by segment and day.

As an example of how the disclosed subject matter improves over conventional and/or known approaches, an exemplary benefit estimation is provided herein. Assuming that there are 1,000 segments of interest, data for a year (365 days), 1 Billion entities and 100 Billion events in a dataset at hand. Each row is represented using 500 bytes, thus the total size of data is 50 Terabytes. Assuming reasonable reading speed from disk of 1000 Megabytes per second (see various disk reading speeds available on public cloud machines, as provided for example by Amazon Web Services™: https://aws(dot)amazon(dot)com/ebs/features/), reading the entire set of data once would take about 14 hours to read on a single machine, or about 1 hour on a cluster of 14 machines, assuming equal distribution of load between the machines. The obvious solution mentioned would require reading the events data 365,000 times (one time for each pair of date and segments). For a cluster of 14 machines, this would take 365,000 hours, or 41 years! For practical reasons, this is not realistic at all. So users (i.e. organizations and/or the like) would usually calculate the trend only for specific important segments and limited time ranges.

By employing the disclosed subject matter, the whole calculation would take just one scan of the data, which would take about 1 hour on a small cluster of 14 machines, according to the disk read speed we assumed. The other calculations would take up to a few hours as well, and the whole process will finish in less than 12 hours. Thus the disclosed subject matter provides a significant advantage and contribution over current state of the art approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods of segment trend analytics query processing will be developed and the scope of the term segment trend analytics is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for conservation of computational resources of a database system, comprising:

receiving a database query, at the database system, said database system comprising a computer including a processor coupled to a storage device comprising a data store storing records of a plurality of events of a plurality of entities, wherein said database query comprising a queried time point and a set of criteria which defines conditions to be met by a content of said events data, wherein a segment of interest is defined as a subset of said plurality of entities which are recorded as having events that meet said set of criteria;

for each entity of said plurality of entities, performing, by the processor at the database system:

aggregating a set of all events related to the respective entity from the stored plurality of events of said plurality of entities;

sorting said set of all events of the respective entity in an ascending time order from earliest to latest;

determining a subset of events for the respective entity, by sequentially processing the set of all events of the respective entity from earliest to latest, to incrementally construct said subset of events therefrom, wherein each event of said subset of events has an event time which is earlier than said queried time point and wherein said sequentially processing stops when a processed event has an event time point later than said queried time point;

determining segment membership of said each entity by applying a predicate function on a respective subset of events of said respective entity, wherein said segment membership is determined when at least one event of said respective subset of events meets respective conditions defined for said respective segment of interest, according to said predicate function; and in response to the predicate function returning a segment membership indication for the respective entity, generating and storing at the data store at least one first data record for the respective entity indicated as a member of said respective segment of interest, wherein said at least one first data record comprising an identification of the respective entity, the event time, and identification of the respective segment of interest;

calculating at least one analytic measure calculated for the segment of interest, based on all first data records generated and stored for respective entities identified as members of said respective segment of interest; and creating a second data record comprising said identification of the respective segment of interest, said queried time point and an indication of the at least one analytic measure calculated for the respective segment of interest, whereby determination of a trend of the segment of interest is enabled.

2. The method of claim 1, wherein the subset is a prefix subset comprising successive events of the set starting at an earliest event thereof and grown per iteration by a respective event for which a time thereof is immediately succeeding a time of a last event processed in preceding iteration, whereby avoiding processing of events with times later than the time of the respective event.

3. The method of claim 1, wherein the at least one analytic measure is a quantity of a segment-related value selected from the group consisting of: a count; an average; a sum; a minimum; and a maximum.

4. The method of claim 1, wherein a plurality of machines for performing parallel processing are employed, wherein one of the plurality of machines is assigned with one entity of the plurality of entities and respective set of events thereof, and another of the plurality of machines is assigned with a different entity of the plurality of entities and respective set of events thereof.

5. The method of claim 1, wherein the plurality of data records is retrieved from the data store using a distributed search query engine.

6. The method of claim 1, further comprising outputting to a user an indication of the trend determined.

7. A computer program product comprising:
a non-transitory computer readable storage medium;
program instructions for executing, by a processor coupled to a storage device comprising a data store storing records of a plurality of events of a plurality of entities, a method for conservation of computational resources of a database system, the method comprising:
receiving a database query, at the database system, said database system comprising a computer including the processor, a database query comprising a queried time point and a set of criteria which defines conditions to be met by a content of said events data, wherein a segment of interest is defined as a subset of said plurality of entities which are recorded as having events that meet said set of criteria;
for each entity of said plurality of entities, performing, by the processor at the database system:
aggregating a set of all events related to the respective entity from the stored plurality of events of said plurality of entities;
sorting said set of all events of the respective entity in an ascending time order from earliest to latest;
determining a subset of events for the respective entity, by sequentially processing the set of all events of the respective entity from earliest to latest, to incrementally construct said subset of events therefrom, wherein each event of said subset of events has an event time which is earlier than said queried time point and wherein said sequentially processing stops when a processed event has an event time point later than said queried time point;
determining segment membership of said each entity by applying a predicate function on a respective subset of events of said respective entity, wherein said segment membership is determined when at least one event of said respective subset of events meets respective conditions defined for said respective segment of interest, according to said predicate function; and,
in response to the predicate function returning a segment membership indication for the respective entity, generating and storing at the data store at least one first data record for the respective entity indicated as a member of said respective segment of interest, wherein said at least one first data record comprising an identification of the respective entity, the event time, and identification of the respective segment of interest;

calculating at least one analytic measure calculated for the segment of interest, based on all first data records generated and stored for respective entities identified as members of said respective segment of interest; and, creating a second data record comprising said identification of the respective segment of interest, said queried time point and an indication of the at least one analytic measure calculated for the respective segment of interest, whereby determination of a trend of the segment of interest is enabled.

8. The computer program product of claim 7, wherein the subset is a prefix subset comprising successive events of the set starting at an earliest event thereof and grown per iteration by a respective event for which a time thereof is immediately succeeding a time of a last event processed in preceding iteration, whereby avoiding processing of events with times later than the time of the respective event.

9. The computer program product of claim 7, wherein the at least one analytic measure is a quantity of a segment-related value selected from the group consisting of: a count; an average; a sum; a minimum; and a maximum.

10. The computer program product of claim 7, wherein a plurality of machines for performing parallel processing are employed, wherein one of the plurality of machines is assigned with one entity of the plurality of entities and respective set of events thereof, and another of the plurality of machines is assigned with a different entity of the plurality of entities and respective set of events thereof.

11. The computer program product of claim 7, wherein the plurality of data records is retrieved from the data store using a distributed search query engine.

12. The computer program product of claim 7, further comprising program instruction to cause the processor to perform: outputting to a user an indication of the trend determined.

13. A system for conservation of computational resources of a database system, comprising:
a processing circuitry coupled to a storage device comprising a data store storing records of a plurality of events of a plurality of entities, and adapted to execute a code for:
receiving a database query, at the database system, said database system comprising a computer including the processing circuitry, wherein the database query comprising a queried time point and a set of criteria which defines conditions to be met by a content of said events data, wherein a segment of interest is defined as a subset of said plurality of entities which are recorded as having events that meet said set of criteria;

for each entity of said plurality of entities, performing, by the processing circuitry at the database system:

aggregating a set of all events related to the respective entity from the stored plurality of events of said plurality of entities;

sorting said set of all events of the respective entity in an ascending time order from earliest to latest;

determining a subset of events for the respective entity, by sequentially processing the set of all events of the respective entity from earliest to latest, to incrementally construct said subset of events therefrom, wherein each event of said subset of events has an event time which is earlier than said queried time point and wherein said sequentially processing stops when a processed event has an event time point later than said queried time point;

determining segment membership of said each entity by applying a predicate function on a respective subset of events of said respective entity, wherein said segment membership is determined when at least one event of said respective subset of events meets respective conditions defined for said respective segment of interest, according to said predicate function; and, in response to the predicate function returning a segment membership indication for the respective entity, generating and storing at the data store at least one first data record for the respective entity indicated as a member of said respective segment of interest, wherein said at least one first data record comprising an identification of the respective entity, the event time, and identification of the respective segment of interest;

calculating at least one analytic measure calculated for the segment of interest, based on all first data records generated and stored for respective entities identified as members of said respective segment of interest; and, creating a second data record comprising said identification of the respective segment of interest, said queried time point and an indication of the at least one analytic measure calculated for the respective segment of interest, whereby determination of a trend of the segment of interest is enabled.

14. The system of claim 13, wherein the subset is a prefix subset comprising successive events of the set starting at an earliest event thereof and grown per iteration by a respective event for which a time thereof is immediately succeeding a time of a last event processed in preceding iteration, whereby avoiding processing of events with times later than the time of the respective event.

15. The system of claim 13, wherein the at least one analytic measure is a quantity of a segment-related value selected from the group consisting of: a count; an average; a sum; a minimum; and a maximum.

16. The system of claim 13, wherein a plurality of machines for performing parallel processing are employed, wherein one of the plurality of machines is assigned with one entity of the plurality of entities and respective set of events thereof, and another of the plurality of machines is assigned with a different entity of the plurality of entities and respective set of events thereof.

17. The system of claim 13, wherein the plurality of data records is retrieved from the data store using a distributed search query engine.

18. The system of claim 13, wherein the processing circuitry is further adapted to execute code for: outputting to a user an indication of the trend determined.

* * * * *